US011720696B2

(12) United States Patent
Agrawal et al.

(10) Patent No.: US 11,720,696 B2
(45) Date of Patent: Aug. 8, 2023

(54) SUPERVISORY MONITORING OF CONTENT CONSUMPTION

(71) Applicant: MOTOROLA MOBILITY LLC, Chicago, IL (US)

(72) Inventors: Amit Kumar Agrawal, Bangalore (IN); Alexandre Neves Creto, Sao Paulo (BR)

(73) Assignee: Motorola Mobility LLC, Chicago, IL (US)

(*) Notice: Subject to any disclaimer, the term of this patent is extended or adjusted under 35 U.S.C. 154(b) by 86 days.

(21) Appl. No.: 17/196,149

(22) Filed: Mar. 9, 2021

(65) Prior Publication Data
US 2022/0292208 A1 Sep. 15, 2022

(51) Int. Cl.
G06F 21/62 (2013.01)
G06F 3/14 (2006.01)
H04L 67/1097 (2022.01)
G06F 21/31 (2013.01)
G06V 10/25 (2022.01)
H04L 67/60 (2022.01)
H04L 67/50 (2022.01)
G06V 30/10 (2022.01)

(52) U.S. Cl.
CPC ............ *G06F 21/62* (2013.01); *G06F 3/1423* (2013.01); *G06F 21/31* (2013.01); *G06V 10/25* (2022.01); *H04L 67/1097* (2013.01); *H04L 67/535* (2022.05); *H04L 67/60* (2022.05); *G06F 2221/2107* (2013.01); *G06V 30/10* (2022.01)

(58) Field of Classification Search
CPC ......... G06F 21/62; G06F 21/31; H04L 67/535
See application file for complete search history.

(56) References Cited

U.S. PATENT DOCUMENTS 9,419,735 B2 * 8/2016 McCrea ................. H04H 60/76
2013/0036458 A1 * 2/2013 Liberman ............... G06F 21/32
726/5
2021/0120308 A1 * 4/2021 Gonzalez ........... H04N 21/4756

* cited by examiner

*Primary Examiner* — Esther B. Henderson
(74) *Attorney, Agent, or Firm* — Isidore PLLC

(57) ABSTRACT

An electronic device, method and computer program product enable detecting user attention to dynamic content and enabling subsequent user access. The electronic device includes display device(s), a memory containing application(s) and a content monitoring supervisor (CMS) application, and a controller. The controller is communicatively coupled to the display device(s) and the memory and which executes the CMS application to configure the electronic device to perform functionality. The functionality includes retrieving content requested by the application(s). The functionality includes presenting at least a portion of the content on the display device(s). The functionality includes storing information associated with a particular portion of the content in response to determining that the particular portion has been viewed by a user of the electronic device for more than a time threshold. The functionality includes enabling access to the stored information by a second user in response to authenticating supervisory credentials of the second user.

20 Claims, 8 Drawing Sheets

Capture a screenshot of the display device via an image capturing device
540

Capture a zoomed-in image of the particular portion of the content on the screen
542

Perform optical character recognition of the particular portion of the content
544

Identify and copy the metadata associated with the particular portion of the content
546

Identify one or more of a date, a time, and a location of the particular portion of the content
548

Identify an access path of the particular portion of the content
550

*FIG. 5D*

SUPERVISORY MONITORING OF CONTENT CONSUMPTION

TECHNICAL FIELD

The present disclosure relates generally to electronic devices having display device(s), and more particularly to electronic devices that track user consumption of content presented on the display device(s).

DESCRIPTION OF THE RELATED ART

Electronic devices such as smart phones, tablets, laptops, workstations, etc., are frequently used to retrieve and review content. The content can be written or spoken word, graphics elements, music, or data. Certain content items can be static and specifically locatable at a particular storage address, enabling a user to "bookmark", "like", tag as a "favorite", or otherwise designate a particular address for later reference. Certain applications or network providers of content automate this tagging and tracking of frequented storage addresses by maintaining a history of access. Such tracking can be unwanted due to user privacy concerns and can be limited to links viewed via a specific application. In addition, the history can become cumbersome by including links that were inadvertently accessed or only momentary displayed without the user paying any attention to the content.

Social media is a source of news and commentary, characterized by being an aggregation of dynamic content that is frequently changed. A particular application can have an endless stream of content that changes each time the particular application is accessed. During a single session, the user can scroll through a stream of content, ignoring certain sections while paying attention to other particular sections. Interacting with the content, such as by posting a response or a reaction, can create a record that enables the user to subsequently access a particular portion of the content again. However, such designations also enable others to note interest of this user with the content, which may be undesirable from a privacy standpoint. In addition, particular content items may not provide a way for a user to manually select the content item for later access. In certain contexts, the content being consumed by the user is of interest to another person, such as someone who is in a supervisory or parental role relative to the user. The parent/supervisor typically has to personally review all dynamic content to screen for problematic content.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5A-5D (FIG. 5) present a flow diagram of a method for detecting and recording user attention to dynamic content and enabling subsequent access to the stored content by a supervisory user, according to one or more embodiments.

DETAILED DESCRIPTION

Figure 1:
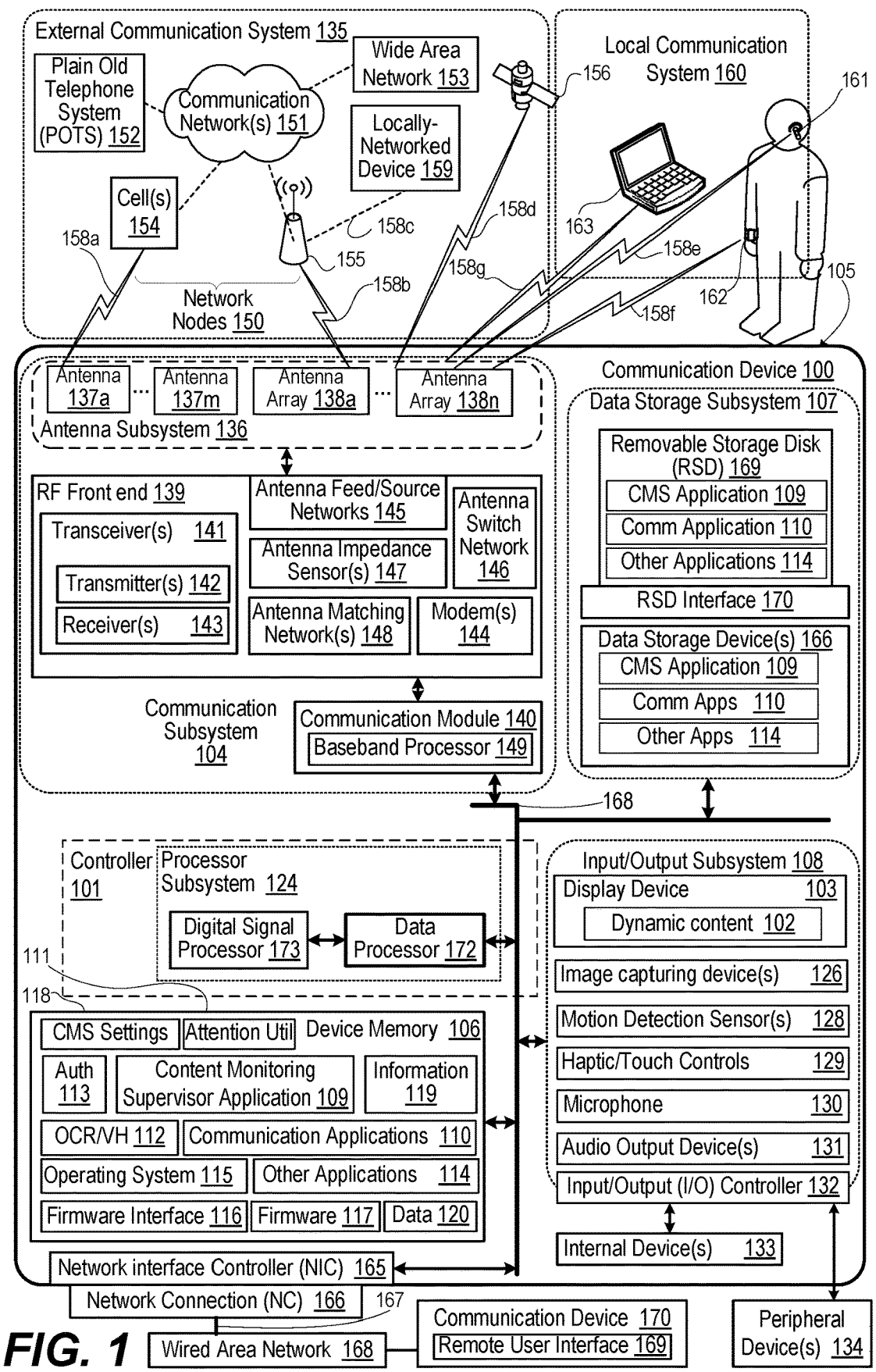
FIG. 1 depicts a functional block diagram of a communication device with at least one user display device for presenting dynamic content and within which the features of the present disclosure are advantageously implemented, according to one or more embodiments.

According to aspects of the present disclosure, an electronic device, method, and computer program product enable detecting and recording user attention to dynamic content and enabling subsequent access by a supervisory user to the specific content. The electronic device includes display device(s), a memory containing application(s) and a content monitoring supervisor (CMS) application, and a controller. The controller is communicatively coupled to the display device(s) and the memory. The controller executes the CMS application to configure the electronic device to perform functionality. The functionality includes retrieving content requested by the application(s). The functionality includes presenting at least a portion of the content on the display device(s). The functionality includes storing information associated with a particular portion of the content in response to determining that the particular portion has been viewed by a user of the electronic device for more than a time threshold. The functionality includes enabling access to the stored information by a second user in response to authenticating supervisory credentials of the second user.

For clarity, the present disclosure discusses dynamic content, especially dynamic content that is an aggregation of multiple viewable elements that are not readily tagged for later user access. Aspects of the present disclosure can also incorporate traditional techniques for tracking content that a user has taken an action to designate for later retrieval. As an example, a user can bookmark a particular uniform resource locator (URL) for network content. As another example, a user can add a content address to a favorite list. As an additional example, a user can create a shortcut to content. Information about the manually selected dynamic content can be included along with automatically collected information of user consumption of the dynamic content. In one or more embodiments, the capturing of information, which includes a complete copy, and which is based on detected user attention thereto (i.e., without express user selection), can be limited to dynamic content, as static content can normally be later retrieved/accessed. As an example, information for static content can be limited to synopsis data and a location. The capturing allows the user or others to later retrieve the content when the dynamic content has been updated or removed. Limiting the scope of what information (or type of information, e.g., dynamic versus static) is captured conserves storage space. In one or more embodiments, screenshot capture may be used for dynamic content, where the entire content presented on screen is preserved for later access. Thus, the present disclosure is not dependent on content providers to maintain the dynamic content for later access.

In one or more alternate embodiments, both static and dynamic content that is the focus of user attention (consumption) is captured. As an example of dynamic content, social media is a source of news and commentary, characterized by being an aggregation of content that is frequently (dynamically) changed. A particular application can have an endless stream of content that changes each time the particular application is accessed. As an example of static content, some websites archive previously featured articles at a static network address that does not change. According to one aspect, the present disclosure enables the monitoring and storing of content across a content ecosystem by leveraging system access to multiple display devices to independently obtain information about the various content, including screenshots.

Additionally, in one or more embodiments, the features of the present disclosure can be incorporated into a single application, whereby the functionality of dynamically capturing content is applied to content that is retrieved and presented on a display device via the single application (e.g., a web browser). However, the present disclosure can also be applied to the overall device usage, where the capturing and storing of user-consumed content are not limited to a single application. Features of the present disclosure can be implemented at a system level without direct incorporated into each and every application that is being monitored.

In one or more embodiments that involve integrating the features of the disclosure into a single application, the application is enhanced with functional software modules that enable automatic monitoring and capture of consumed dynamic content. As an example, a conventional application can track what files have been recently opened. The present disclosure can add features that go beyond a history listing of storage addresses. According to one aspect, information is captured that is meaningful to the user about particular portions that were consumed, making subsequent queries and browsing more efficient and/or effective for the user. The information about the particular portions consumed by the user can be analyzed to enable specific queries to be supported. The information can include a complete copy of the particular portions of the dynamic content, enabling retrieval even if the original copy has become irretrievable.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device, and more particularly communication device 100, which is managed by controller 101, in an operating environment within which the features of the present disclosure are advantageously implemented. Controller 101 monitors dynamic content 102 presented on at least one display device 103. Controller 101 determines an amount (or an elapsed time) of user attention to particular content items. In response to detecting that the period of time associated with the user attention to a particular portion of the content exceeds a threshold time for consuming the particular portion of the content, controller 101 stores information that enables subsequent user access to the stored information, which can include the particular portion of content.

Communication device 100 can be one of a host of different types of devices, including but not limited to, a mobile cellular phone, satellite phone, or smart-phone, a laptop, a net-book, an ultra-book, a networked smart watch, or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100). In one or more embodiments, communication device 100 encompasses functional components within housing 105. In one or more embodiments, communication device 100 has functional components encompassed by more than one housing 105.

Referring again to the specific component makeup and the associated functionality of communication device 100 of FIG. 1. In one or more embodiments, communication device 100 includes communication subsystem 104, device memory 106, data storage subsystem 107, and input/output (I/O) subsystem 108. Device memory 106 and each subsystem (104, 107, and 108) are managed by controller 101. Device memory 106 includes program code and applications such as content monitoring supervisor (CMS) application 109, communication applications 110, user attention utility 111, optical character recognition/view hierarchy (OCR/VH) utility 112, authentication utility 113, and other application(s) 114 that retrieve and present dynamic content 102. Device memory 106 further includes operating system (OS) 115, firmware interface 116, such as basic input/output system (BIOS) or Uniform Extensible Firmware Interface (UEFI), and firmware 117. Device memory 106 includes CMS settings data 118, user attention information 119, or other computer data 120 used by CMS application 109. Processor subsystem 124 of controller 101 executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of CMS application 109 to monitor dynamic content 102.

I/O subsystem 108 includes image capturing device(s) 126. I/O subsystem 108 includes user interface devices such as at least one display device 103, motion detection sensors 128, touch/haptic controls 129, microphone 130, and audio output device(s) 131. I/O subsystem 108 also includes I/O controller 132. In one or more embodiments, motion detection sensors 128 can detect an orientation and movement of the communication device 100. In one or more embodiments, motion detection sensors 128 are used for functions other than user inputs, such as detecting an impending ground impact. I/O controller 132 connects to internal devices 133, which are internal to housing 105 and to peripheral devices 134, such as external speakers, which are external to housing 105 of communication device 100. A wireless or a wired connection such as using a universal serial bus (USB) cable can be used. As another example, communication device 133 can be connected via a high definition multimedia interface (HDMI) cable to an external monitor. Examples of internal devices 133 are computing, storage, communication, or sensing components depicted within housing 105. I/O controller 132 supports the necessary configuration of connectors, electrical power, communication protocols, and data buffering to act as an interface to internal devices 133 and peripheral devices 134 to other components of communication device 100 that use a different configuration for inputs and outputs.

Communication subsystem 104 of communication device 100 enables wireless communication with external communication system 135. Communication subsystem 104 includes antenna subsystem 136 having lower band antennas 137a-137m and higher band antenna arrays 138a-138n that can be attached in/at different portions of housing 105. Communication subsystem 104 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 104 includes baseband processor 149 that communicates with controller 101 and RF front end 139. Baseband processor 149 operates in baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 in order to electromagnetically isolate a particular antenna.

In one or more embodiments, controller 101, via communication subsystem 104, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cells 154 such as provided by base stations or base nodes that support cellular OTA communication using radio access technology (RAT) as part of a radio access network (RAN).

In one or more embodiments, network nodes 150 can be access node(s) 155 that support wireless OTA communication. Communication subsystem 104 can receive OTA communication from location services such as provided by global positioning system (GPS) satellites 156. Communication subsystem 104 communicates via OTA communication channel(s) 158a with cells 154. Communication subsystem 104 communicates via wireless communication channel(s) 158b with access node 155. In one or more particular embodiments, access node 155 supports communication using one or more IEEE 802.11 wireless local area network (WLAN) protocols. In one or more particular embodiments, communication subsystem 104 communicates with one or more locally networked devices 159 via wired or wireless link 158c provided by access node 155. Communication subsystem 104 receives downlink broadcast channel(s) 158d from GPS satellites 156 to obtain geospatial location information.

In one or more embodiments, controller 101, via communication subsystem 104, performs multiple types of OTA communication with local communication system 160. In one or more embodiments, local communication system 160 includes wireless headset 161 and smart watch 162 that are coupled to communication device 100 to form a personal access network (PAN). Communication subsystem 104 communicates via low power wireless communication channel(s) 158e with headset 161. Communication subsystem 104 communicates via second low power wireless communication channel(s) 158f, such as Bluetooth, with smart watch 162. In one or more particular embodiments, communication subsystem 104 communicates with other communication device(s) 163 via wireless link 158g to form an ad hoc network. As an example, wireless link 158g can be via a MIRACAST connection using Wi-Fi Direct.

In one or more embodiments, I/O subsystem 108 includes network interface controller (NIC) 165 with a network connection (NC) 166 on housing 105. Network cable 167 connects NC 166 to wired area network 168. Wired area network 168 can be a local area network (LAN), a campus area network (CAN), a metropolitan area network (MAN), or a wide area network (WAN). For example, NC 166 can be an Ethernet connection. Remote user interface (UI) 169 presented on communication device 170 is communicatively coupled to wired area network 168.

Data storage subsystem 107 of communication device 100 includes data storage device(s) 176. Controller 101 is communicatively connected, via system interlink 178, to data storage device(s) 176. Data storage subsystem 107 provides applications, program code, and stored data on nonvolatile storage that is accessible by controller 101. For example, data storage subsystem 107 can provide a selection of program code and applications such as CMS application 109, optical character recognition (OCR) utility 112, and other application(s) 114 that use communication services. These applications can be loaded into device memory 106 for execution by controller 101. In one or more embodiments, data storage device(s) 176 can include hard disk drives (HDDs), optical disk drives, and/or solid-state drives (SSDs), etc. Data storage subsystem 107 of communication device 100 can include removable storage device(s) (RSD(s)) 179, which is received in RSD interface 180. Controller 101 is communicatively connected to RSD 179, via system interlink 178 and RSD interface 180. In one or more embodiments, RSD 179 is a non-transitory computer program product or computer readable storage device. Controller 101 can access RSD 179 or data storage device(s) 176 to provision communication device 100 with program code, such as CMS application 109 and other applications 114. When executed by controller 101, the program code causes or configures communication device 100 to provide the dynamic content monitoring and tracking functionality described herein.

Controller 101 includes processor subsystem 124, which includes one or more central processing units (CPUs), depicted as data processor 182. Processor subsystem 124 can include one or more digital signal processors 183 such as baseband processor 149 of communication module 140. Digital signal processors 183 are integrated with data processor 182 or are communicatively coupled to data processor 182. In one or more alternate embodiments (not depicted), controller 101 can further include distributed processing and control components that are peripheral or remote to housing 105 or are grouped with other components, such as I/O subsystem 108. Data processor 182 is communicatively coupled, via system interlink 178, to device memory 106. In one or more embodiments, controller 101 of communication device 100 is communicatively coupled via system interlink 178 to communication subsystem 104, data storage subsystem 107, and input/output subsystem 107. System interlink 178 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 178) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Figure 2:
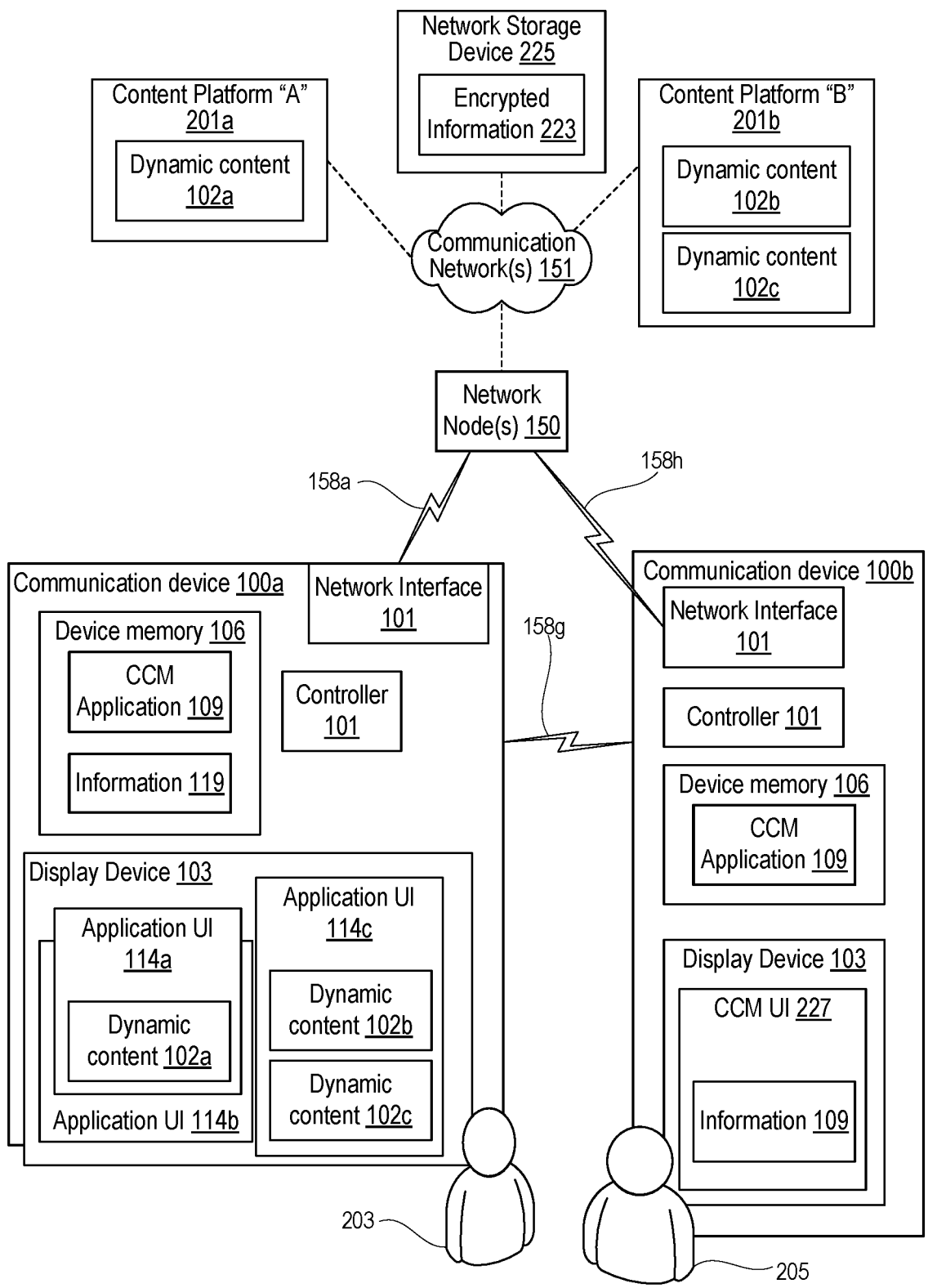
FIG. 2 depicts a communication diagram of the communication device of FIG. 1 communicatively connected via a network to sources of content, according to one or more embodiments.

FIG. 2 depicts a communication diagram of communication device 100a, which is assigned to user 203, communicatively connected via communication network 151 (FIG. 1) or wired area network 169 (FIG. 1) to sources of content, content platform "A" 201a and content platform "B" 201b, via wireless link 158a, network node(s) 150 and communication network(s) 151. Communication device 100a can have similar or identical components and functionality as described for communication device 100 (FIG. 1). Content platform "A" 201a provides dynamic content 102a. Content platform "B" 201b provides dynamic content 102b and dynamic content 102c. Communication device 100 includes at least one display device 103 that presents dynamic content 102a in application user interface (UI) 114a. Controller 101 monitors presentation of dynamic content 102a and detects user attention to dynamic content 102a. Controller 101 can also monitor other display elements, such as application UI 114b that has a lower view hierarchy, being currently obscured by application UI 114a. Controller 101 can also monitor and detect user attention to another application UI 114c that is simultaneously presented with application UI 114a. In one of more embodiments, application UI 114c can present more than one dynamic content 102b-102c. As an example, communication device 100 can have one or more display devices 103 that enable simultaneous presenting of multiple browser and application windows for monitoring social and news postings. A particular social media application can have multiple segregated panels or sub-windows that present different dynamic content for consuming. In one or more embodiments, communication device 100 has display device 103 that supports a single application UI 114a presenting single dynamic content 102a. Different application UIs 114a-114c can be sequentially presented and monitored by controller 101. Controller 101 executes CMS application 109 stored in device memory 106 to retrieve dynamic content 102a-102b and to monitor user consumption of presentation of one or more portions of dynamic content 102a-102b on at least one display device 103. In response to determining that the amount of time associated with user attention to a particular portion of the content exceeds a threshold time for consuming the particular portion of the content, controller 101 stores user attention information 119 that comprises one or more of: (i) a storage location address or path to the particular portion of the dynamic content 102a-102b; (ii) a copy of the particular portion of the dynamic content 102a-102b; and (iii) metadata associated with the particular portion of dynamic content 102a-102b. The storing of user attention information 119 enables subsequent user access to the stored information. In one or more embodiments, user attention information 119 can be stored in a portion of device memory 106 dedicated to CMS application 109 to independently provide query results and browsing opportunities to the user. In one or more embodiments, user attention information 119 can be stored in the portion of device memory 106 maintained by CMS application 109 that is read accessible by application UIs 114a-114c to individually provide query results and browsing opportunities to the user. The query results may be limited to dynamic content 102a-102c that is accessible by the particular application UIs 114a-114c. In one or more embodiments, CMS application 109 can integrated with application UIs 114a-114c to enhance functionality of content monitoring and tracking data maintained by application UIs 114a-114c.

In one or more embodiments, controller 101 enables access to information 119 by supervisory user 205 in response to authenticating supervisory credentials presented on/to communication device 100a. Supervisory user 205 can also present supervisory credentials on communication device 100b that is communicatively coupled via wireless link 158g to communication device 100a. Communication device 100b can be communicatively coupled to communication device 100a via wireless link 158h to network node(s) 150 and communication network(s) 151. In one or more embodiments, controller 101 of communication device 100a stores encrypted information 223 on network storage device 225 enabling supervisory user access via communication device 100b. CMS application 109, executed by controller 101 of communication device 100b, presents information via CMS user interface 227 on display device 103 of communication device 100b.

Figure 3:
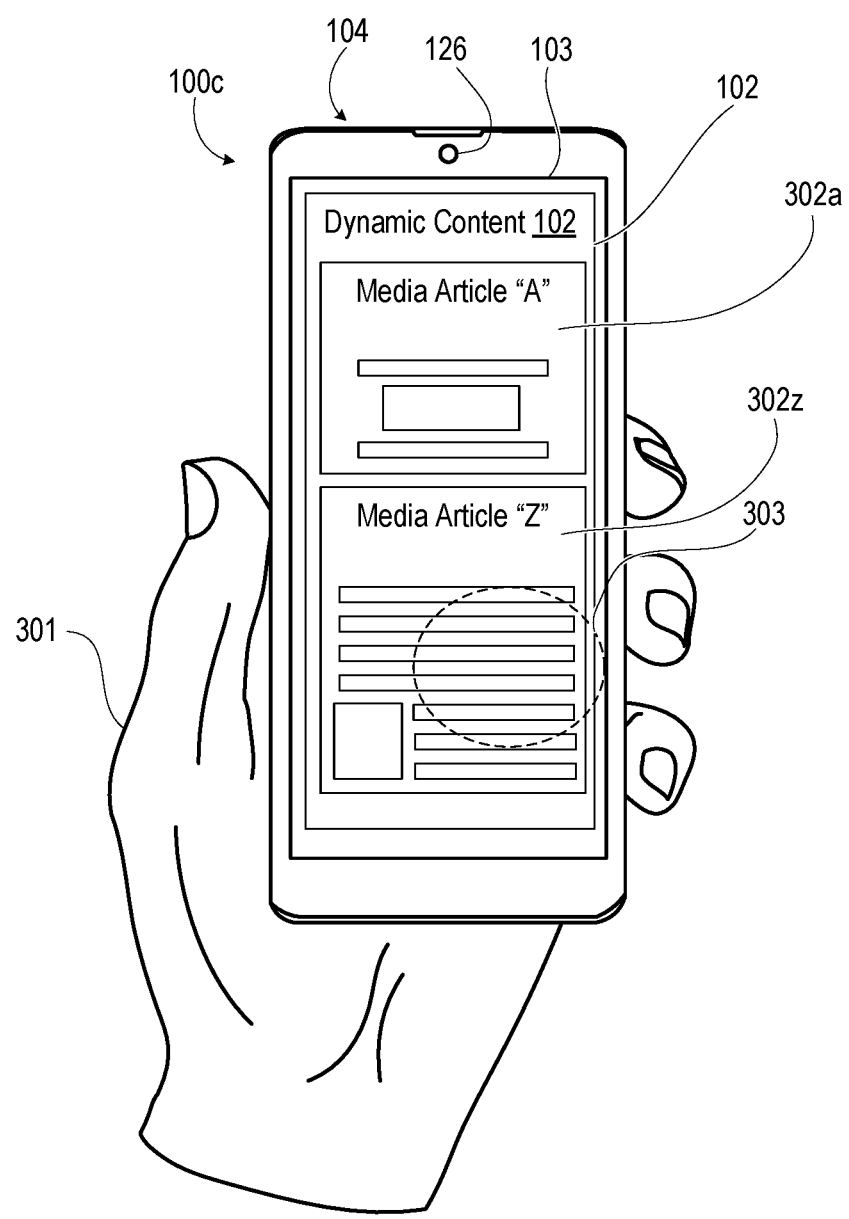
FIG. 3 depicts a front view of the communication device of FIG. 1 in a hand of a user consuming content presented on a display of the communication device, according to one or more embodiments.

FIG. 3 depicts a front view of communication device 100c in hand 301 of a user consuming content presented on display device 103 of communication device 100c. Communication device 100c can have similar or identical components and functionality as described for communication device 100 (FIG. 1). Display device 103 presents dynamic content 102 that can have multiple portions 302a-302z, some of which can be viewed simultaneously or sequentially. Each portion 302a-302z of dynamic content 102 can have a different quantity or density of information, which requires a corresponding different amount of time for a user to focus his/her attention on the information versus quickly scanning the information. Image capturing device 126 can be a front camera that detects a gaze or focus by the user on (i.e., the user paying attention to) a particular portion 303 of dynamic content 102. In one or more embodiments, controller 101 (FIG. 1) has privileged access to rendering of graphical information on display device 103. Controller 101 is given privileged (higher level) access at a system level to data and functional components, where such privileged access is not necessarily afforded to applications. The privileged access enables bitmap screenshot capture of one of (i) particular portion 303, (ii) portion 302z ("media article "Z") that encompasses particular portion 303, or (iii) an entire presentation that includes other portions 302a ("media article "A") as well as particular portion 303. In one or more embodiments, in response to detecting gaze or focus by the user to particular portion 303 for a requisite period of time, controller 101 (FIG. 1) performs one or more of optical character recognition (OCR), pattern recognition, object recognition, etc., to capture information associated with particular portion 303. In one or more embodiments, controller 101 (FIG. 1) has system-level privileged access to view hierarchy information about dynamic content 102. View hierarchy can include information associated with particular portion 303, such as local or network storage address, metadata, version history, summaries, reviews, etc.

According to aspects of the present disclosure, controller 101 (FIG. 1) operates in a non-intrusive and private manner in the background as one or more applications 114 provide dynamic content 102. The applications 114 can select dynamic content 102 based on several contextual criteria including user interests, user preferences, device settings, contacts, locations, time day, current events, etc. In other instances, user can select dynamic content 102 to present. A user may find some dynamic content 102 of interest but choose to not overtly tag or designate portions of dynamic content 102. In certain applications 114, such overt tagging or designations are not only exploitable by the provider of application 114 but can be visible to other users. The user may choose to preserve privacy. The user can also fail to tag or designate dynamic content 102 for later retrieval merely due to an oversight. Subsequently, the user may desire to reference or again review dynamic content 102 of interest; however, the user may encounter difficulty locating particular portions 303 due to the large quantity of dynamic content 102 that is browsed or due to a change occurring in dynamic content 102 by the time the dynamic content 102 is later accessed. Controller 101 (FIG. 1) infers what particular portions 303 are of interest to the user by detecting the amount of attention paid by the user to particular portions 303. In response to detecting user attention to particular portions 303, controller 101 (FIG. 1) stores some or all of the information of dynamic content 102 for later reference.

Figure 4:
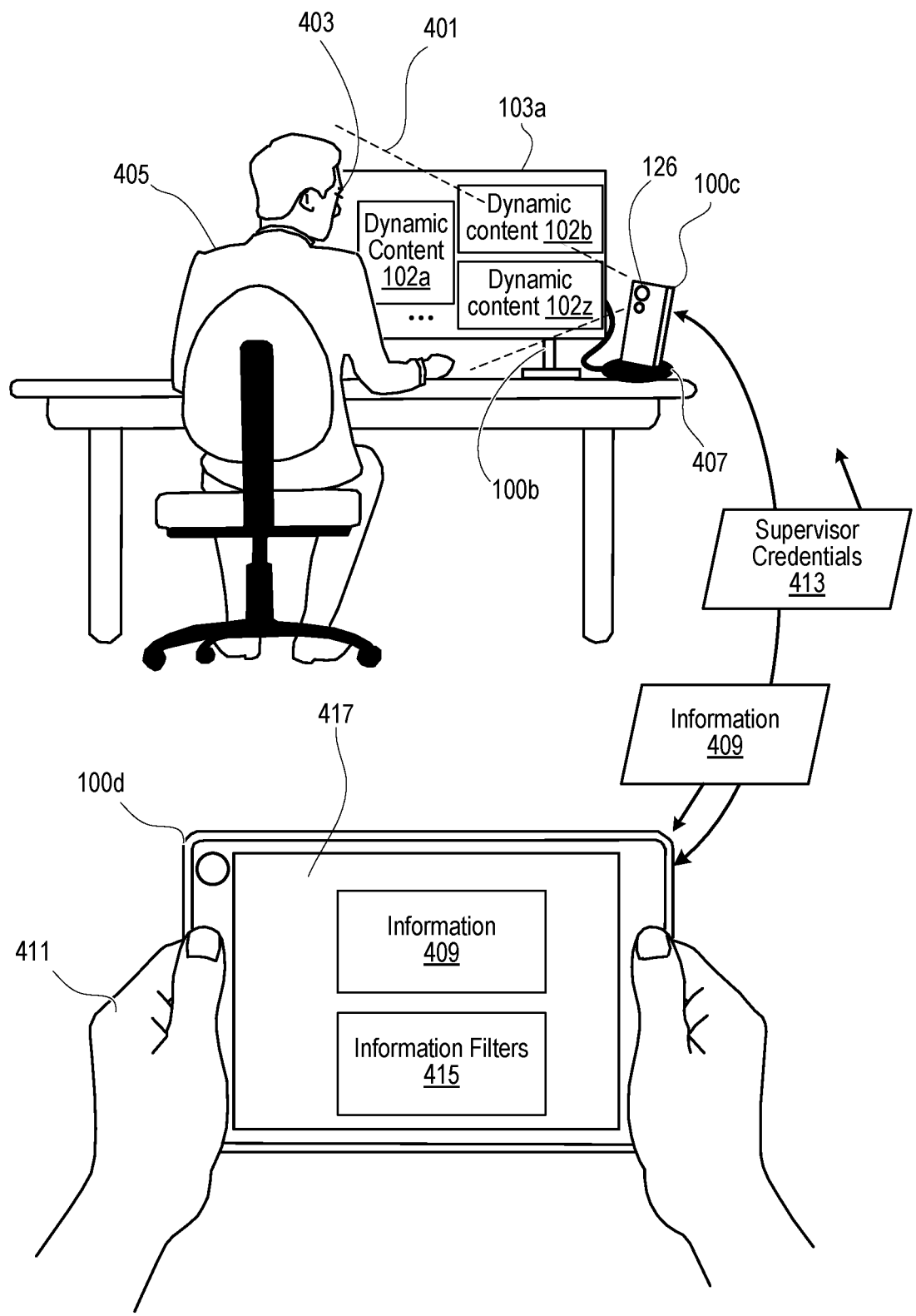
FIG. 4 presents a front view of a docked communication device positioned to have a field of view encompassing a face of a user viewing an external display device, according to one or more embodiments.

FIG. 4 presents a front view of docked communication device 100c positioned for image capturing device 126 to have field of view (FOV) 401 encompassing face 403 of user 405 viewing external display device 103a. In one or more embodiments, dock 407 is in a fixed or previously calibrated position relative to the external display device 103a. In one or more embodiments, the FOV 401 encompasses at least a portion of external display device 103a to calibrate face orientation relative to external display device 103a. In one or more embodiments, FOV 401 is sufficient for communication device 100a to determine that user 405 is viewing the external display device 103a but not a particular portion of what is presented on external display device 103a. According to one aspect, communication device 100c is a portable, mobile, or hand-held device positioned for stationary use in dock 407 next to external display device 103a. In one or more embodiments, external display device 103a is a television or display monitor. In one or more embodiments, external display device 103a is a display of second communication device 100*b* that is communicatively connected to communication device 100*c*. As one example, communication device 100*c* can have an image capturing device 126 but has a small display 103. For better content viewing, the content is projected to and/or presented on second communication device 100*b*, which can be a desktop workstation, laptop, or smart television.

In an illustrative scenario, controller 101 (FIG. 1) accesses or creates a list of dynamic feed-based application or content providers that triggers aspects of the present disclosure. As an example, a user could benefit from collecting content from a social application but choose not to collect content from a non-social application. As another example, controller 101 (FIG. 1) may access and maintain settings that individually enable the present disclosure for each application. As an additional example, controller 101 (FIG. 1) can access metadata provided by a source provider of content to determine that the application presents dynamic content. Controller 101 (FIG. 1) triggers aspects of the present disclosure based on the determination of dynamic content. As yet another example, controller 101 (FIG. 1) can discern from prior sessions with each application, that content retrieved is dynamic, changing session to session. Controller 101 (FIG. 1) triggers aspects of the present disclosure based on the learned determination of dynamic content. Controller 101 (FIG. 1) determines that one application 114 is in a foreground of external display device 103*a*. Controller 101 (FIG. 1) performs aspects of the present disclosure to detect the user's attention to particular portions of application 114. In certain conventional communication devices, "attentive display" is a feature that is used to determine when to turn off the display. The conventional communication device detects when a user is looking generally at the display, which delays turning off the display in the same manner as touches to the display also cause a delay. The attentive display feature can be used in the absence of, or in addition to, detecting user overt interaction with presented content. In one or more aspects, the present disclosure enhances the attentive display by monitoring the length of time that the user consumes the current presentation of the dynamic content. In one or more embodiments, the present disclosure further enhances the attentive display feature by determining a particular portion of the current presentation of the dynamic content that is being consumed. The determined attention is more granular and delineated.

In response to determining consumption of a particular portion of dynamic content, information is obtained from application 114 or other components of communication device 100. As an example, a screenshot of a user interface of application 114 as presented on display device 103 is captured. As an additional example, text and associated information are obtained based on text or image recognition of the screenshot of the user interface. As another example, the information is obtained based on accessing metadata contained in an electronic document or file that is rendered to present the dynamic content 102. The information about the consumed dynamic content is stored for subsequent access.

In one or more embodiments, the stored information can be presented as a topical or chronological digest or index for user review and selection. In one or more embodiments, the stored information can be indexed for querying. Upon a subsequent launch of application 114, controller 101 (FIG. 1) can provide images or text to the user in response to a search for desired content. As an example, the user can readily retrieve previously presented content for subsequent posting on social media. In one or more embodiments, controller 101 (FIG. 1) can pull together information across multiple applications 114, assisting the user in finding particular dynamic content regardless of how originally viewed. As an example, the user may monitor multiple applications 114 for news and personal information. The user may not recall which particular application 114 provided content of interest. By automatically detecting and capturing content that has been consumed, the present disclosure assists in the user in locating previously consumed content.

In one or more embodiments, supervisory user 411 accesses information 409 on either communication device 100*c* or another electronic device 100*d* by presenting supervisor credentials 413. Communication device 100*d* can have similar or identical components and functionality as described for communication device 100 (FIG. 1). In one or more embodiments, supervisory user 411 and/or any person with correct supervisor credentials has access to information 409. In one or more embodiments, supervisory user 411 can select information filters 415 that determine types of information 409 that is pushed to supervisor user interface 417. In an example, information filters 415 include selections for problematic dynamic content that is impermissible according to company or parental guidelines.

In a particular embodiment, supervisor user 411 has full use of communication device 100*d* but allows limited use of communication device 100*c* by user 405. Communication device 100*c* is communicatively connected to external display device 103*a* via a wired or wireless connection. A phone window view, which is controlled by a phone setting, is provided to mirror the phone UI along with a UI configured for the size and aspect ratio of the external display device 103*a*. Display configurations for both communication device 100*c* and external display device 103*a* are user controllable. When user 405 accesses features of communication device 100*c* that are outside of a particular application UI, controller 101 can alert user 411 via communication device 100*c*.

Figure 5A:
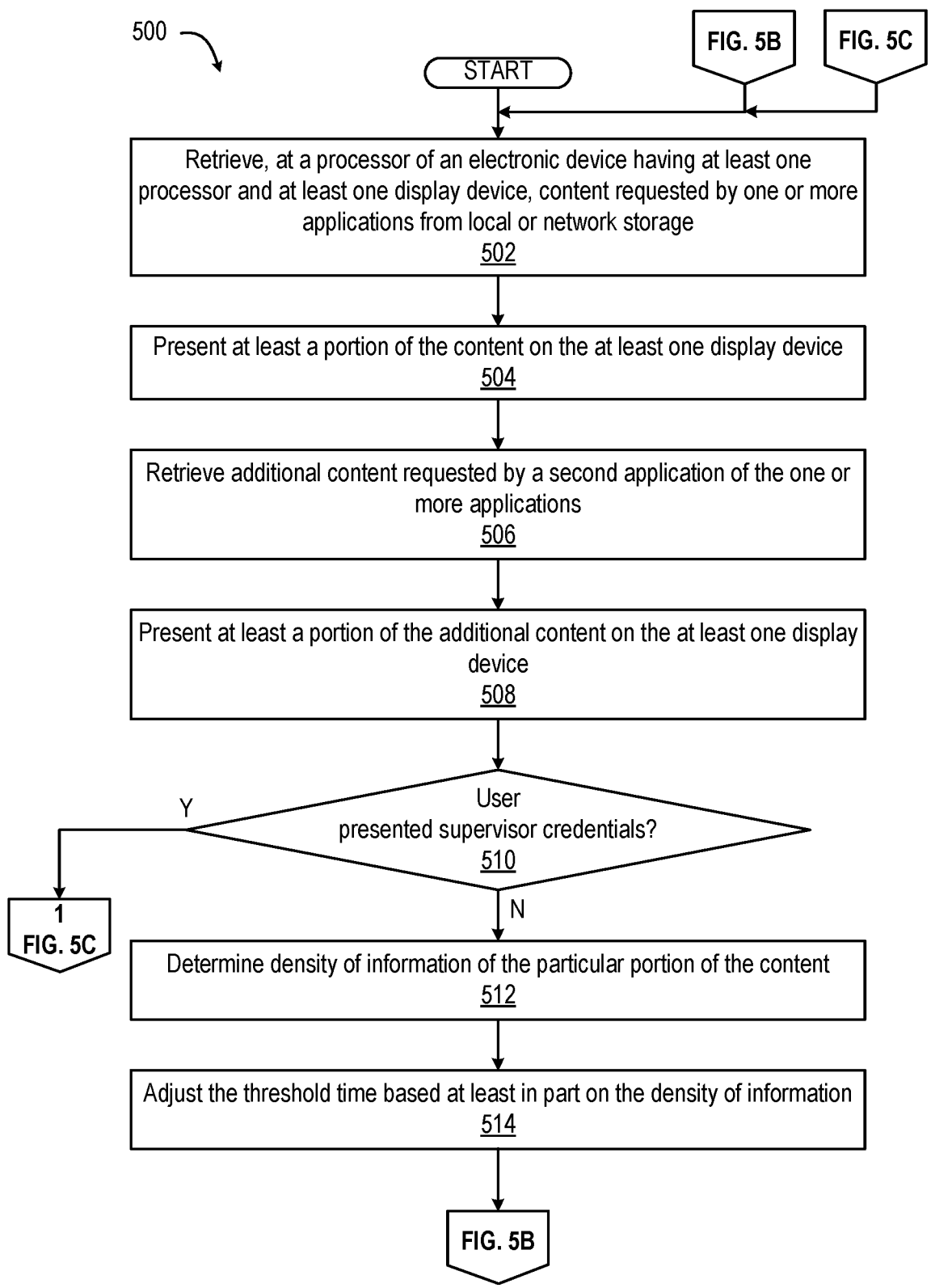
Figure 5B:
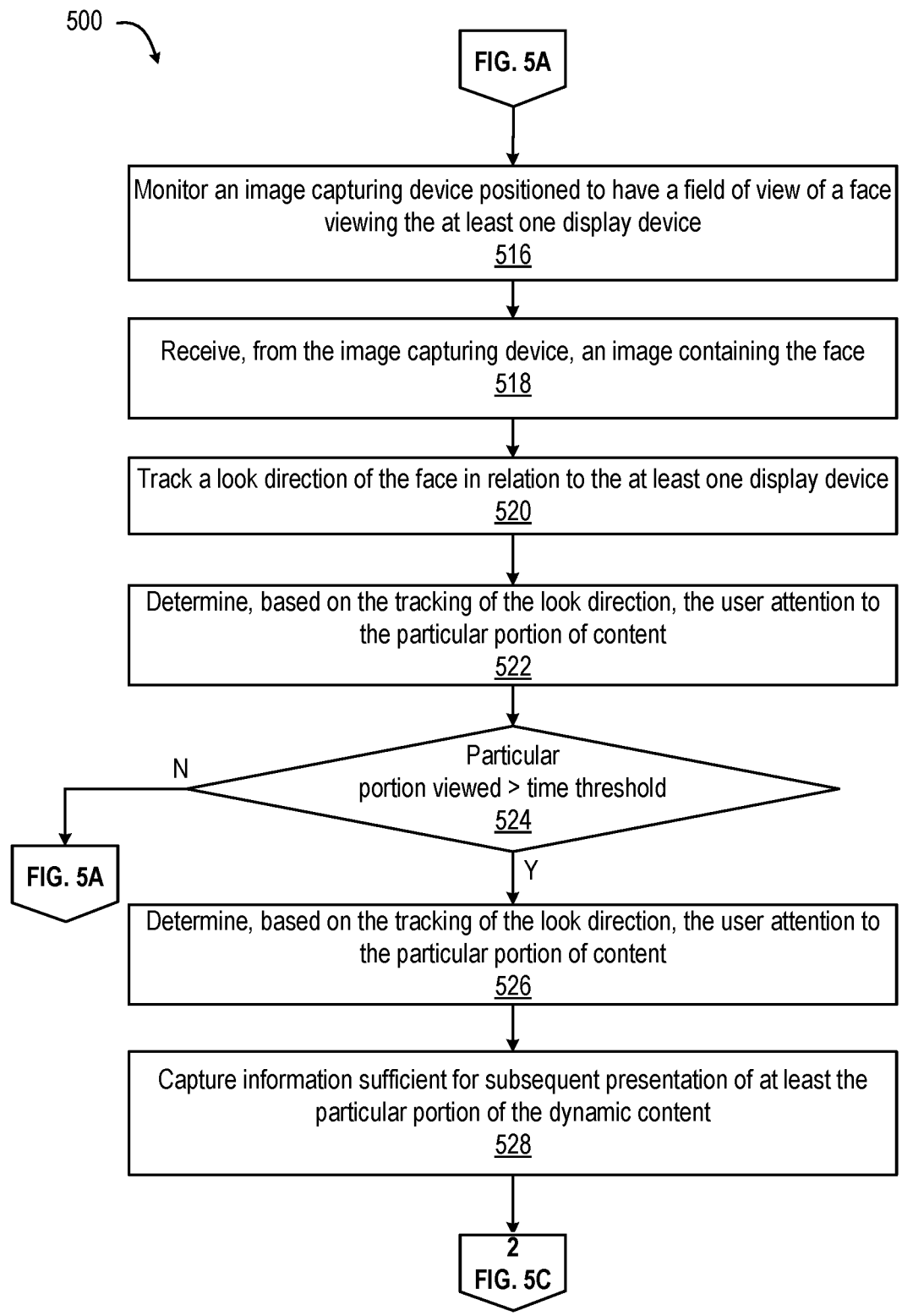
Figure 5C:
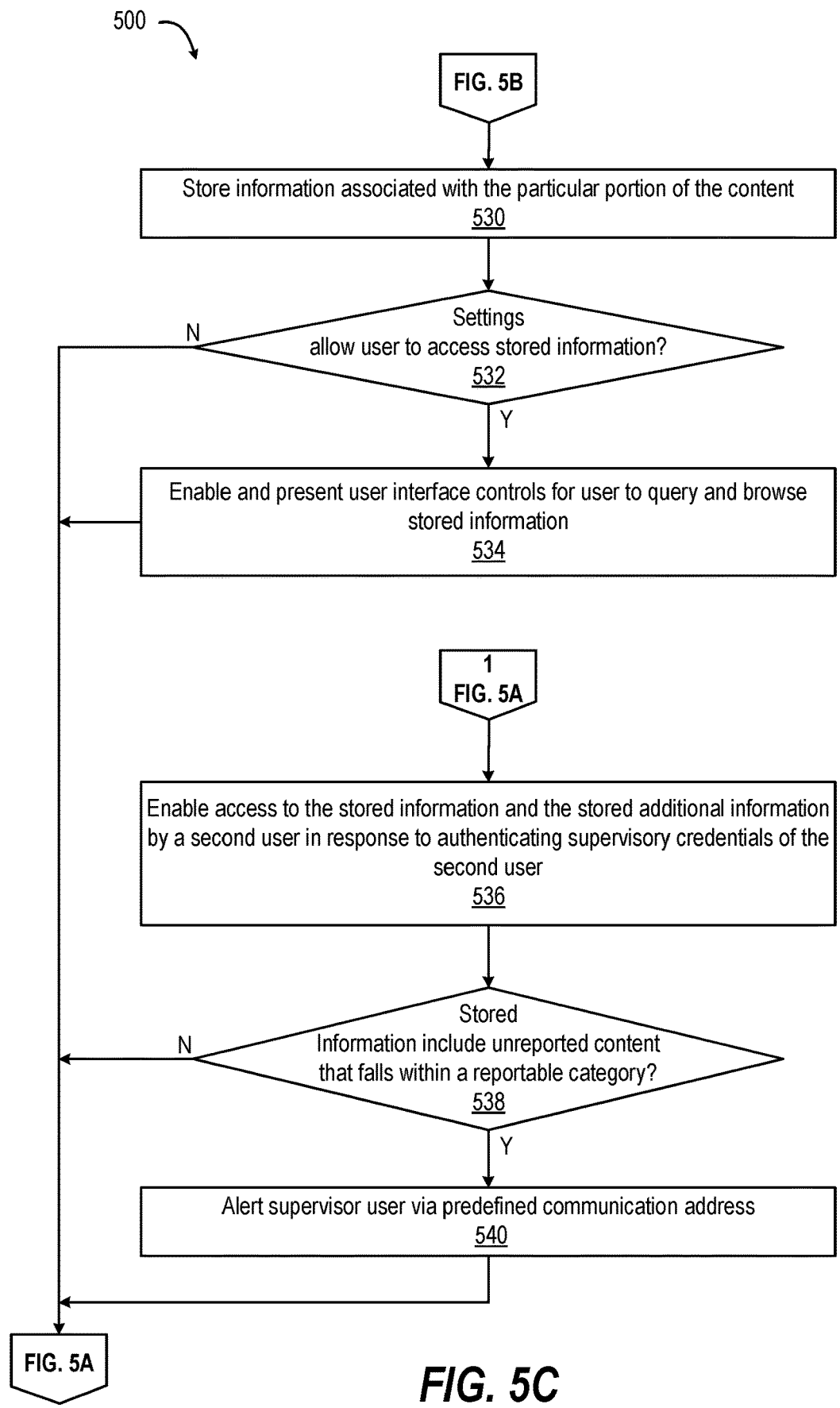

FIGS. 5A-5C (FIG. 5) present a flow diagram of method 500 for detecting user attention to dynamic content and enabling subsequent user access by a supervisory user. The description of method 500 is provided with general reference to the specific components illustrated within the preceding FIGS. 1-3. In at least one embodiment, communication device 100, managed by controller 101, executes CMS application 109 (FIG. 1) to detect content consumption. Specific components referenced in method 500 can be identical or similar to components of the same name used to describe preceding FIGS. 1-4. With reference to FIG. 5A, method 500 includes retrieving, via a processor of an electronic device having at least one processor and at least one display device, content requested by one or more applications from local or network storage (block 502). Method 500 includes presenting at least a portion of the content on the at least one display device (block 504). Method 500 includes retrieving additional content requested by a second application of the one or more applications (block 506). Method 500 includes presenting at least a portion of the additional content on the at least one display device (block 508). Method 500 includes determining whether a user of the electronic device has presented supervisor credentials (decision block 510). In one or more embodiments, the user presents no credentials, and any non-supervisory user of the electronic device is monitored. In one or more embodiments, the user presents credentials that are authenticated as a non-supervisory user. In response to determining that the user has not presented supervisory credentials, method 500 includes determining density of information of the particular portion of the content (block 512).

With reference to FIG. 5B, method 500 includes adjusting a threshold time based at least in part on the density of information (block 514). More densely packed information is afforded a longer threshold time for viewing compared to less densely packed information. Method 500 includes monitoring an image capturing device positioned to have a field of view encompassing a face viewing the at least one display device (block 516). Method 500 includes receiving, from the image capturing device, an image containing the face (block 518). Method 500 includes tracking a look direction of the face in relation to the at least one display device (block 520). Method 500 includes determining, based on the tracking of the look direction, the user attention to the particular portion of content (block 522). Method 500 includes determining whether the particular portion has been viewed by a user of the electronic device for more than a time threshold (decision block 524). In response to determining that the particular portion has not been viewed by the user of the electronic device for more than a time threshold, method 500 returns to block 502 (FIG. 5A). In response to determining that the particular portion has been viewed by a user of the electronic device for more than a time threshold, method 500 includes determining, based on the tracking of the look direction, the user attention to the particular portion of content (block 526). Method 500 includes capturing information sufficient for subsequent presentation of at least the particular portion of the dynamic content (block 528).

With reference to FIG. 5C, method 500 includes storing information associated with the particular portion of the content (block 530). Method 500 includes determining whether a setting indicates that the user is allowed to query and browse the stored information (decision block 532). In response to determining that the setting does allow the user to query and browse the stored information, method 500 includes enabling and presenting user interface controls for querying and browsing the stored information (block 534). After block 534 or in response to determining that the setting does not allow the user to query and browse the stored information, method 500 returns to block 502 (FIG. 5A).

In response to determining that the user has presented supervisory credentials in decision block 510 (FIG. 5A), method 500 includes enabling access to the stored information and the stored additional information (block 536). In one or more embodiments, method 500 includes enabling access to the stored information using the supervisory credentials (block 5). Then method 500 returns to block 502. method 500 includes determining whether stored information includes any unreported content that falls within a reportable category (decision block 538). In response to determining that the stored content includes unreported content that falls within a reportable category, method 500 includes alerting the supervisory user via a predefined communication address (block 540). After block 540 or in response to determining that the stored content does not include unreported content that falls within a reportable category, method 500 ends.

FIG. 5D provides several different methods for completing the capturing of the content (block 528). In one or more embodiments, method 500 includes capturing a screenshot of the display device via an image capturing device (block 540). In one or embodiments, method 500 includes capturing a zoomed-in image of the particular portion of the content on the screen (block 542). In one or embodiments, method 500 includes performing optical character recognition of the particular portion of the content (block 544). In one or embodiments, method 500 includes identifying and copying the metadata associated with the particular portion of the content (block 546). In one or embodiments, method 500 includes identifying one or more of a date, a time, and a location of the particular portion of the content (block 548). In one or embodiments, method 500 includes identifying an access path of the particular portion of the content (block 550).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
at least one display device;
a memory containing one or more applications and a content monitoring supervisor (CMS) application; and
a controller communicatively coupled to the at least one display device and the memory and which executes the CMS application to configure the electronic device to:
retrieve content requested by one or more applications;
present at least a portion of the content on the at least one display device;
adjust a threshold time for viewing the content based at least in part on the density of information in the portion of the content, wherein more densely packed information is afforded a longer threshold time for viewing compared to less densely packed information;
store information associated with a particular portion of the content in response to determining that the particular portion has been viewed by a user of the electronic device for more than the time threshold; and
enable access to the stored information by a second user in response to authenticating supervisory credentials of the second user.

2. The electronic device of claim 1, wherein the controller stores the information associated with the content further in response to determining that the user has not presented supervisory credentials.

3. The electronic device of claim 1, wherein the controller:
retrieves additional content requested by a second application of the one or more applications;
presents at least a portion of the additional content on the at least one display device;
stores additional information associated with a second particular portion in response to determining that the second particular portion has been viewed by the user of the electronic device for more than the time threshold; and
enables access to the stored information and the stored additional information by the second user in response to authenticating the supervisory credentials of the second user.

4. The electronic device of claim 1, wherein, in enabling access to the stored information, the controller performs one or more of:
encrypts the information using the supervisory credentials; and
transmits the encrypted information to a second electronic device associated with the second user; and
stores the encrypted information on a network storage device that is communicatively connected to the second electronic device.

5. The electronic device of claim 1, further comprising a communication subsystem having a network interface, the communication subsystem communicatively coupled to the controller and communicatively connectable, via the network interface and a network, to one or more external sources of content, and the controller configures the electronic device to retrieve the content from the one or more sources that are network-connected to the electronic device via the network interface.

6. The electronic device of claim 1, wherein prior to storing the information, the controller performs one or more of: (i) capturing a screenshot of the at least one display device; (ii) capturing a zoomed-in image of the particular portion of the content on the at least one display device; (iii) performing optical character recognition of the particular portion of the content; (iv) identifying and copying the metadata associated with the particular portion of the content; (v) identifying one or more of a date, a time, and a location of a viewing of the particular portion of the media content; (vi) identifying an access path of the particular portion of the content; (v) performing graphical image recognition of the particular portion of the content; and (vi) access information associated with a view hierarchy of the content.

7. The electronic device of claim 1, wherein the controller:
determines the density of information of the particular portion of the content.

8. The electronic device of claim 1, further comprising an image capturing device communicatively coupled to the controller and positioned to have a field of view of a face viewing the at least one display device, wherein the controller:
receives, from the image capturing device, an image containing the face;
tracks a look direction of the face in relation to the at least one display device; and
determines, based on the tracking of the look direction, the user attention to the particular portion of content.

9. A method comprising:
retrieving, at a processor of an electronic device having at least one processor and at least one display device, content requested by one or more applications;
presenting at least a portion of the content on the at least one display device;
adjusting a threshold time for viewing the content based at least in part on a density of information within the portion of the content, wherein more densely packed information is afforded a longer threshold time for viewing compared to less densely packed information;
storing information associated with a particular portion of the content in response to determining that the particular portion has been viewed by a user of the electronic device for more than the time threshold; and
enabling access to the stored information by a second user in response to authenticating supervisory credentials of the second user.

10. The method of claim 9, wherein storing the information associated with the content further is in response to determining that the user has not presented supervisory credentials.

11. The method of claim 9, further comprising:
retrieving additional content requested by a second application of the one or more applications;
presenting at least a portion of the additional content on the at least one display device;
storing additional information associated with a second particular portion in response to determining that the second particular portion has been viewed by the user of the electronic device for more than the time threshold; and enabling access to the stored information and the stored additional information by the second user in response to authenticating the supervisory credentials of the second user.

12. The method of claim 9, wherein enabling access to the stored information comprises one or more of:

encrypting the information using the supervisory credentials;

transmitting the encrypted information to a second electronic device associated with the second user; and storing the encrypted information on a network storage device that is communicatively connected to the second electronic device.

13. The method of claim 9, further comprising retrieving the content from one or more sources that are network-connected to the electronic device via a network interface.

14. The method of claim 9, wherein prior to storing the information, the further comprises one or more of:

capturing a screenshot of the at least one display device;

capturing a zoomed-in image of the particular portion of the content on the at least one display device;

performing optical character recognition of the particular portion of the content;

identifying and copying the metadata associated with the particular portion of the content;

identifying one or more of a date, a time, and a location of a viewing of the particular portion of the media content;

identifying an access path of the particular portion of the content;

performing graphical image recognition of the particular portion of the content; and accessing information associated with a view hierarchy of the content.

15. The method of claim 9, further comprising:

determining the density of information of the particular portion of the content.

16. The method of claim 9, further comprising:

monitoring an image capturing device positioned to have a field of view of a face viewing the at least one display device;

receiving, from the image capturing device, an image containing the face;

tracking a look direction of the face in relation to the at least one display device; and determining, based on the tracking of the look direction, the user attention to the particular portion of content.

17. A computer program product comprising:

a computer readable storage device; and program code on the computer readable storage device that when executed by a processor associated with a device, the program code enables the communication device to provide the functionality of:

retrieving content requested by one or more applications;

presenting at least a portion of the content on the at least one display device;

adjusting a threshold time for viewing the content based at least in part on a density of information within the portion of the content, wherein more densely packed information is afforded a longer threshold time for viewing compared to less densely packed information;

storing information associated with a particular portion of the content in response to determining that the particular portion has been viewed by a user of the electronic device for more than the time threshold; and enabling access to the stored information by a second user in response to authenticating supervisory credentials of the second user.

18. The computer program product of claim 17, wherein the program code enables the communication device to provide the functionality of storing the information associated with the content further in response to determining that the user has not presented supervisory credentials.

19. The computer program product of claim 17, wherein the program code enables the communication device to provide the functionality of:

retrieving additional content requested by a second application of the one or more applications;

presenting at least a portion of the additional content on the at least one display device;

storing additional information associated with a second particular portion in response to determining that the second particular portion has been viewed by the user of the electronic device for more than the time threshold; and enabling access to the stored information and the stored additional information by the second user in response to authenticating the supervisory credentials of the second user.

20. The computer program product of claim 17, wherein the program code enables the communication device to provide the functionality of:

encrypting the information using the supervisory credentials;

transmitting the encrypted information to a second electronic device associated with the second user; and storing the encrypted information on a network storage device that is communicatively connected to the second electronic device.

* * * * *